(12) United States Patent
Wang

(10) Patent No.: US 12,536,257 B2
(45) Date of Patent: Jan. 27, 2026

(54) ACCOUNT MANAGEMENT METHOD AND APPARATUS, COMPUTER DEVICE AND STORAGE MEDIUM

(71) Applicant: SUZHOU METABRAIN INTELLIGENT TECHNOLOGY CO., LTD., Jiangsu (CN)

(72) Inventor: Guangyue Wang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 253 days.

(21) Appl. No.: 18/564,471

(22) PCT Filed: Apr. 26, 2022

(86) PCT No.: PCT/CN2022/089354
§ 371 (c)(1),
(2) Date: Nov. 27, 2023

(87) PCT Pub. No.: WO2023/077748
PCT Pub. Date: May 11, 2023

(65) Prior Publication Data
US 2024/0256408 A1  Aug. 1, 2024

(30) Foreign Application Priority Data
Nov. 4, 2021 (CN) .......................... 202111301936.4

(51) Int. Cl.
*G06F 21/31* (2013.01)
*G06F 21/45* (2013.01)

(52) U.S. Cl.
CPC .............. *G06F 21/31* (2013.01); *G06F 21/45* (2013.01)

(58) Field of Classification Search
CPC ....... G06F 21/31; G06F 21/45; H04L 67/1095
See application file for complete search history.

(56) References Cited

U.S. PATENT DOCUMENTS 7,236,956 B1 * 6/2007 Ogg ....................... G06Q 50/06
400/403
7,681,234 B2 * 3/2010 Florencio .............. H04L 9/3297
726/22

(Continued)

FOREIGN PATENT DOCUMENTS

| CN | 107733774 A | 2/2018 |
| CN | 108632367 A | 10/2018 |

(Continued)

OTHER PUBLICATIONS

International Search Report for PCT/CN2022/089354 (Jul. 13, 2022).

(Continued)

*Primary Examiner* — Aravind K Moorthy
(74) *Attorney, Agent, or Firm* — Merchant & Gould P.C.

(57) ABSTRACT

An account management method and apparatus, a computer device and a storage medium. The method includes: acquiring login information of an old account, so that a local database authenticates the login information of the old account, and acquiring decrypted login information of the old account; creating a first account according to the decrypted login information of the old account; and acquiring an identity document of the first account, so that the identity document of the first account is transmitted to the old account corresponding to the local database, and associating the first account with the old account.

20 Claims, 7 Drawing Sheets

(56) References Cited

U.S. PATENT DOCUMENTS

| | | | |
|---|---|---|---|
| 7,979,912 B1* | 7/2011 | Roka | H04N 21/6582 726/28 |
| 8,190,757 B1* | 5/2012 | Davis | G06F 9/468 709/225 |
| 8,201,217 B1* | 6/2012 | Begen | H04L 63/0815 726/2 |
| 8,539,568 B1* | 9/2013 | Milas | G06F 21/41 726/8 |
| 8,601,548 B1* | 12/2013 | Shen | G06F 21/6209 713/161 |
| 8,750,208 B1* | 6/2014 | Chindapol | G06F 21/33 370/328 |
| 8,875,261 B2* | 10/2014 | Delia | H04L 63/20 726/6 |
| 9,065,819 B1* | 6/2015 | Shanmugam | G06F 21/41 |
| 9,077,703 B1* | 7/2015 | Goshen | H04L 63/08 |
| 9,178,876 B1* | 11/2015 | Johansson | G06F 21/00 |
| 9,294,460 B1* | 3/2016 | Thomas | H04L 63/0807 |
| 9,355,233 B1* | 5/2016 | Chen | H04L 9/0891 |
| 9,397,989 B1* | 7/2016 | Ramalingam | H04L 63/08 |
| 9,436,943 B1* | 9/2016 | Shankar | G06Q 20/3821 |
| 9,491,155 B1* | 11/2016 | Johansson | G06F 21/604 |
| 9,537,857 B1* | 1/2017 | Koved | H04L 63/083 |
| 9,634,999 B1* | 4/2017 | Marion | G06F 21/64 |
| 10,824,476 B1* | 11/2020 | Zhang | G06F 21/31 |
| 10,861,092 B1* | 12/2020 | Misra | G06N 7/01 |
| 10,924,514 B1* | 2/2021 | Altman | G06N 7/01 |
| 11,277,415 B1* | 3/2022 | Rinehart | H04L 63/068 |
| 11,303,627 B2* | 4/2022 | Maria | H04L 63/0815 |
| 11,481,837 B1* | 10/2022 | Brandt | G06F 21/45 |
| 11,625,491 B1* | 4/2023 | Quevedo | G06F 21/602 713/155 |
| 2003/0004874 A1* | 1/2003 | Ludwig | G06Q 30/04 705/40 |
| 2004/0201604 A1* | 10/2004 | Kraenzel | G06Q 10/10 707/999.201 |
| 2005/0021782 A1* | 1/2005 | Malik | H04L 63/083 709/229 |
| 2006/0015930 A1* | 1/2006 | Shoham | H04L 63/126 726/6 |
| 2007/0199053 A1* | 8/2007 | Sandhu | H04L 9/321 726/4 |
| 2008/0082832 A1* | 4/2008 | McDougal | H04L 9/3226 726/2 |
| 2008/0201767 A1* | 8/2008 | Williams | G06F 21/31 726/6 |
| 2009/0109941 A1* | 4/2009 | Carter | H04W 8/18 370/338 |
| 2009/0150677 A1* | 6/2009 | Vedula | G06F 21/46 726/1 |
| 2009/0172793 A1* | 7/2009 | Newstadt | G06F 21/31 726/6 |
| 2009/0293108 A1* | 11/2009 | Weeden | G06F 21/41 726/6 |
| 2009/0328154 A1* | 12/2009 | Field | G06F 21/46 726/4 |
| 2010/0100948 A1* | 4/2010 | Delia | H04L 63/0846 726/6 |
| 2010/0325687 A1* | 12/2010 | Iverson | G06F 21/41 717/134 |
| 2010/0325705 A1* | 12/2010 | Iverson | G06F 21/445 726/6 |
| 2011/0023107 A1* | 1/2011 | Chen | H04L 63/0281 726/12 |
| 2011/0145922 A1* | 6/2011 | Wood | H04L 51/212 709/206 |
| 2013/0013476 A1* | 1/2013 | Knafelz | G06Q 40/00 705/35 |
| 2013/0013921 A1* | 1/2013 | Bhathena | H04L 63/045 713/168 |
| 2013/0031619 A1* | 1/2013 | Waltermann | H04L 9/3226 726/8 |
| 2013/0144681 A1* | 6/2013 | Quast | G06Q 10/0635 705/7.28 |
| 2013/0198818 A1* | 8/2013 | Hitchcock | H04L 63/08 726/5 |
| 2013/0340044 A1* | 12/2013 | Litvin | G06F 21/36 709/217 |
| 2014/0137218 A1* | 5/2014 | Matson | G06F 21/335 726/6 |
| 2014/0229331 A1* | 8/2014 | McIntosh | G06Q 30/0613 705/26.41 |
| 2015/0067804 A1* | 3/2015 | Maxwell | H04L 51/48 726/7 |
| 2015/0142650 A1* | 5/2015 | Johnston | G06Q 20/102 705/41 |
| 2015/0281225 A1* | 10/2015 | Schoen | H04L 63/08 726/9 |
| 2015/0324579 A1* | 11/2015 | Qian | G06F 21/45 726/6 |
| 2015/0332062 A1* | 11/2015 | McReynolds | H04L 51/52 726/28 |
| 2016/0044011 A1* | 2/2016 | Gordon | H04L 63/083 726/6 |
| 2016/0071124 A1* | 3/2016 | Lavergne | G06Q 30/0204 705/7.31 |
| 2016/0232294 A1* | 8/2016 | Nuggehalli | H04N 1/00458 |
| 2016/0269398 A1* | 9/2016 | Chhabra | H04L 63/0838 |
| 2016/0294837 A1* | 10/2016 | Turgeman | G06F 21/316 |
| 2017/0048125 A1* | 2/2017 | Hayton | H04L 67/56 |
| 2017/0054711 A1* | 2/2017 | Shen | G06Q 30/0204 |
| 2017/0054759 A1* | 2/2017 | Lee | G06F 21/50 |
| 2017/0070527 A1* | 3/2017 | Bailey | G06F 16/9535 |
| 2017/0093872 A1* | 3/2017 | Braksator | H04L 63/102 |
| 2017/0118245 A1* | 4/2017 | Tcherchian | H04L 63/1416 |
| 2017/0147631 A1* | 5/2017 | Nair | G06Q 20/363 |
| 2017/0180378 A1* | 6/2017 | Tyler | H04L 63/1433 |
| 2017/0351871 A1* | 12/2017 | Christiansen | G06F 21/78 |
| 2018/0115551 A1* | 4/2018 | Cole | H04L 41/0895 |
| 2018/0124037 A1* | 5/2018 | Fang | H04L 61/2503 |
| 2018/0270060 A1* | 9/2018 | Gray | H04L 63/06 |
| 2018/0288043 A1* | 10/2018 | Sims | H04L 63/101 |
| 2018/0357687 A1* | 12/2018 | Groarke | G06Q 20/42 |
| 2019/0007420 A1* | 1/2019 | Eberlein | H04L 63/1425 |
| 2019/0065585 A1* | 2/2019 | Goenka | G06Q 50/01 |
| 2019/0098037 A1* | 3/2019 | Shenoy, Jr. | H04L 63/1441 |
| 2019/0121956 A1* | 4/2019 | Turgeman | G06F 21/316 |
| 2019/0318100 A1* | 10/2019 | Bhatia | G06F 21/554 |
| 2019/0342290 A1* | 11/2019 | Mittal | H04L 63/083 |
| 2019/0370805 A1* | 12/2019 | Van Os | H04W 12/06 |
| 2020/0112585 A1* | 4/2020 | Keohane | G06F 21/316 |
| 2020/0128016 A1* | 4/2020 | Blass | H04L 63/101 |
| 2020/0201986 A1* | 6/2020 | Vaswani | G06F 21/53 |
| 2020/0267178 A1* | 8/2020 | Maor | H04L 63/1425 |
| 2020/0296126 A1* | 9/2020 | Compagna | H04L 63/1433 |
| 2020/0326683 A1* | 10/2020 | Oligschlaeger | G06F 21/608 |
| 2020/0326997 A1* | 10/2020 | Kauffman | H04L 1/188 |
| 2020/0327243 A1* | 10/2020 | Song | G06N 3/08 |
| 2020/0329062 A1* | 10/2020 | Beauchesne | H04L 63/105 |
| 2021/0067551 A1* | 3/2021 | Hebert | H04L 63/1491 |
| 2021/0082043 A1* | 3/2021 | Kanjlia | G06Q 20/02 |
| 2021/0303707 A1* | 9/2021 | Nakajima | H04L 63/0815 |
| 2021/0326432 A1* | 10/2021 | Kaidi | H04L 9/3226 |
| 2021/0334343 A1* | 10/2021 | Asher | H04L 9/3226 |
| 2022/0060479 A1* | 2/2022 | Perkins | H04L 63/083 |
| 2022/0060507 A1* | 2/2022 | Crabtree | G06F 16/2477 |
| 2022/0067716 A1* | 3/2022 | Stanescu | G06Q 20/381 |
| 2022/0075850 A1* | 3/2022 | Ghorbani | G06F 16/9577 |
| 2022/0174061 A1* | 6/2022 | Chitkara | H04L 9/3228 |
| 2022/0368726 A1* | 11/2022 | Balasubramaniam | H04L 63/1441 |
| 2023/0004556 A1* | 1/2023 | Campbell | H04L 67/306 |
| 2023/0092778 A1* | 3/2023 | Koral | H04W 12/12 455/410 |

FOREIGN PATENT DOCUMENTS

| | | |
|---|---|---|
| CN | 108965480 A | 12/2018 |
| CN | 109218326 A | 1/2019 |
| CN | 112367339 A | 2/2021 |

(56) References Cited

FOREIGN PATENT DOCUMENTS

| CN | 112417401 A | 2/2021 |
|----|-------------|--------|
| CN | 113742681 A | 12/2021 |
| WO | 2018/118351 A1 | 6/2018 |

OTHER PUBLICATIONS

Search Report for Chinese Patent Application No. 2021113019364 (Nov. 30, 2021).

* cited by examiner

ACCOUNT MANAGEMENT METHOD AND APPARATUS, COMPUTER DEVICE AND STORAGE MEDIUM

CROSS-REFERENCE TO RELATED APPLICATION

The present application is a National Stage Application of PCT International Application No. PCT/CN2022/089354, filed on Apr. 26, 2022, which claims the benefit of priority to Chinese Patent Application 202111301936.4, filed in the China Patent Office on Nov. 4, 2021, and entitled "Account Management Method and Apparatus, Computer Device and Storage Medium", the entire contents of which are herein incorporated by reference. To the extent appropriate, a claim of priority is made to each of the above-disclosed applications.

TECHNICAL FIELD

The present application relates to an account management method and apparatus, a computer device and a storage medium.

BACKGROUND

Cloud computing is a type of distributed computing, and refers to decomposing a data computing processing program into a plurality of sub-programs by means of a network "cloud", then processing and analyzing these sub-programs by means of a system composed of a plurality of servers, so as to obtain a result, and returning the result to a user.

The inventor realizes that, after the version of a cloud computing platform is updated, during an identity authentication process of an account, there may be a problem that an old account and a new account of a local database, as well as an original account of an identity authentication module are inconsistent, resulting in poor compatibility between the accounts, easily leading to data loss of the accounts, repeatedly creation of the accounts and the like, such that account management is inconvenient.

SUMMARY

According to various embodiments disclosed in the present application, provided are an account management method and apparatus, a computer device and a storage medium.

In one aspect, provided is an account management method, wherein the account management method includes:
login information of an old account is acquired, so that a local database authenticates the login information of the old account, and decrypted login information of the old account is acquired;
a first account is created according to the decrypted login information of the old account; and
an identity document of the first account is acquired, so that the identity document of the first account is transmitted to the old account of the local database, and the first account is associated with the old account.

In one or more embodiments, before the login information of the old account is acquired, so that the local database authenticates the login information of the old account, and the decrypted login information of the old account is acquired, the method further includes:
login information of a current account is acquired, wherein the login information includes an account name;
a plurality of data sources are switched for authentication, and it is judged whether the account name of the current account exists in the local database; and
in response to the account name of the current account existing in the local database, it is judged that the current account is an old account of the local database.

In one or more embodiments, the method further includes:
in response to the account name of the current account not existing in the local database, login of the current account is terminated.

In one or more embodiments, the method further includes:
login information of a new account is acquired;
a second account is created according to the login information of the new account, and an identity document of the second account is acquired;
the login information of the new account is transmitted, so that the local database creates a third account; and
the identity document of the second account is transmitted to the third account, so that the second account is associated with the third account.

In one or more embodiments, the method further includes:
accounts of the local database are acquired and traversed, and a first key value list is acquired according to account names and account information of accounts in the local database;
original accounts are acquired and traversed, and it is judged whether the account names of the original accounts exist in the first key value list;
in response to the account names of the original accounts existing in the first key value list, the account names and the account information, which correspond to the original accounts in the first key value list, are removed; and
in response to the account names of the original accounts not existing in the first key value list, a second key value list is acquired according to the account names and the account information of the original accounts, and the second key value list is updated, so that the second key value list is synchronized to the local database.

In one or more embodiments, after the second key value list is updated, so that the second key value list is synchronized to the local database, the method further includes:
a synchronization progress of synchronizing the second key value list to the local database is displayed, and when the number of the original accounts is greater than or equal to m, the mathematical expression of the synchronization progress is:

$$\text{stepPercent} = (100 - x - y)/(n/m)$$

wherein, stepPercent represents the synchronization progress, x represents a basic progress, y represents the progress of removing the account names and the account information, which correspond to the original accounts in the first key value list, x and y are constants, n represents the number of the original accounts, and m represents the number of accounts which are synchronized at one time.

In one or more embodiments, the step of creating the first account according to the decrypted login information of the old account includes:
a threshold value of the number of the current old accounts which are about to create the first account is set to be p, wherein p is a positive integer; and when the number of the current old accounts is greater than p, redundant current old accounts are configured in a waiting queue.

In one or more embodiments, the login information of the old account and the login information of the new account are acquired by means of a graphical user interface.

In one or more embodiments, the step of creating the first account according to the decrypted login information of the old account includes:

an identity authentication module is logged in, and the first account is created in the identity authentication module according to the decrypted login information of the old account.

In another aspect, provided is an account management apparatus. The account management apparatus includes an identity authentication module, wherein the identity authentication module includes:

a first acquisition component, used for acquiring the login information of an old account, so that a local database authenticates the login information of the old account, and acquiring decrypted login information of the old account;

a creation component, used for creating a first account according to the decrypted login information of the old account; and a second acquisition component, used for acquiring an identity document of the first account, so that the identity document of the first account is transmitted to the old account corresponding to the local database, and associating the first account with the old account.

In another aspect, provided is a computer device, including a memory and one or more processors, wherein a computer-readable instruction is stored in the memory, and when the computer-readable instruction is executed by the one or more processors, the one or more processors execute the steps of the account management method in any one of the foregoing items.

In yet another aspect, provided are one or more non-transitory computer-readable storage media in which computer-readable instructions are stored, wherein when the computer-readable instructions are executed by one or more processors, the one or more processors execute the steps of the account management method in any one of the foregoing items.

The details of one or more embodiments of the present application are set forth in the following drawings and descriptions. Other features and advantages of the present application will become apparent from the specification, drawings and claims.

BRIEF DESCRIPTION OF THE DRAWINGS

To illustrate technical solutions in the embodiments of the present application more clearly, a brief introduction on the drawings which are needed in the description of the embodiments is given below. Apparently, the drawings in the description below are merely some embodiments of the present application, based on which other drawings may also be obtained by those ordinary skilled in the art without any creative effort.

DETAILED DESCRIPTION OF THE EMBODIMENTS

In order to make the objectives, technical solutions and advantages of the present application clearer, the present application is further described in detail below in combination with the drawings and embodiments. It should be understood that the specific embodiments described herein are merely used to explain the present application, and are not used to limit the present application.

Figure 1:
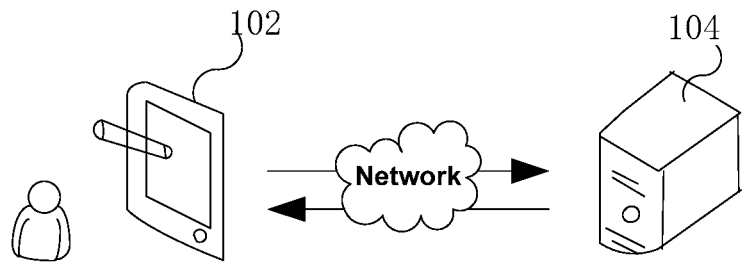
FIG. 1 is an application environment diagram of an account management method in one or more embodiments.

An account management method provided in the present application may be applied to an application environment shown in FIG. 1, wherein a terminal 102 communicates with a server 104 by means of a network. For example, the account management method provided in the present application may be applied to the version updating of a cloud computing platform, so as to solve the problem of poor compatibility between accounts after the version of the cloud computing platform is updated; and an old account of a local server may be associated with a first account of an identity authentication module by means of authentication, login and creation of the identity authentication module, thereby avoiding repeated creation, improving the compatibility between the old account and the first account after the version of the cloud computing platform is updated, simplifying the processing flow of system switching or reconstruction of an account management system after the version of the cloud computing platform is updated, and reducing the costs of account management and information maintenance. The terminal 102 may be, but is not limited to, various personal computers, notebook computers, smart phones, tablet computers, portable wearable devices, or sub-servers, and the server 104 may be implemented by using an independent server or a server cluster composed of a plurality of servers, or the cloud computing platform.

Figure 2:
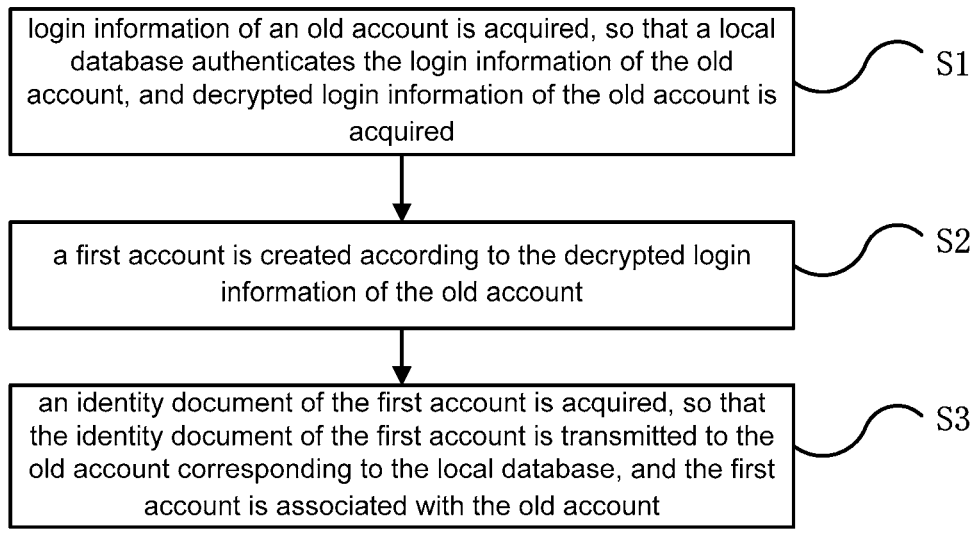
FIG. 2 is a schematic flowchart of an account management method in one or more embodiments.

In one or more embodiments, as shown in FIG. 2, provided is an account management method, it is taken as an example for description that the method is applied to the server 104 in FIG. 1, and the method includes the following steps:

S1: login information of an old account is acquired, so that a local database authenticates the login information of the old account, and decrypted login information of the old account is acquired;

S2: a first account is created according to the decrypted login information of the old account; and S3: an identity document of the first account is acquired, so that the identity document of the first account is transmitted to the old account corresponding to the local database, and the first account is associated with the old account.

In the above account management method, the first account is created according to the decrypted login information of the old account, and the first account is associated with the old account, so that the authentication and management of the accounts can be effectively realized after the version of the cloud computing platform is updated.

In order to solve the problems of poor compatibility and low association degree of the accounts after software upgrading or version updating of the cloud computing platform, the identity authentication module may be provided for the identity authentication of the accounts. Before the software version of the cloud computing platform is updated, the old account of the local database is not associated with the identity authentication module, so the first account may be created in the identity authentication module according to the decrypted login information of the old account, and the first account is associated with the old account. Therefore, the authentication and management of the accounts can be effectively realized after the version of the cloud computing platform is updated.

Before the version of the cloud computing platform is updated, the old account of the local database does not exist in the identity authentication module, the password encryption mode of the old account is generally a hash algorithm, including one of the following algorithms: an MD5 (Message-Digest Algorithm, message-digest algorithm), an SHA (Security Hash Algorithm, security hash algorithm) and the like, and after being encrypted by the hash algorithm, the password of the account has irreversibility, so that the old account of the local database cannot be directly updated to the cloud computing platform after the version of the cloud computing platform is updated. In step S1, exemplarily, after the version of the cloud computing platform is updated, when the old account of the local database is logged in for the first time, the login information of the old account of the local database is acquired, for example, the login information includes an account name and account information. Since the old account exists in the local database and does not exist in the identity authentication module, the decrypted login information of the old account may be acquired by means of the authentication and decryption of the local database, so that the decrypted login information of the old account is used for updating or associating in the cloud computing platform or the identity authentication module.

In order to associate the old account of the local database with the identity authentication module, in step S2, exemplarily, after the local database authenticates the login information of the old account, the identity authentication module is logged in. For example, the identity authentication module is logged in by means of the permission of an internal administrator, or, the login permission of the identity authentication module is triggered by means of authenticating the login information of the old account for login, and in the logged-in identity authentication module, the first account is created according to the decrypted login information of the old account, so that the old account of the local database is associated with the identity authentication module by means of the first account, and thus the security of account authentication can also be improved.

In order to improve the compatibility between the old account and the first account in the identity authentication module, in step S3, exemplarily, after the first account is created, the identity document (Identity Document, ID) of the first account may be acquired, and the identity document of the first account is transmitted to the old account corresponding to the local database. For example, after the first account is successfully created, the unique identity document id of the first account is acquired, the unique identity document id is stored in a field ext_resource_id of the old account corresponding to the local database, so that the old account is associated with the first account, and the synchronization of the old account in the identity authentication module of the cloud computing platform is completed. The old account may be authenticated by means of the identity authentication module during the next time login, the identity authentication of the old account of the local database is realized after version updating, and the reconstruction or switching of the account management system is facilitated.

Figure 3:
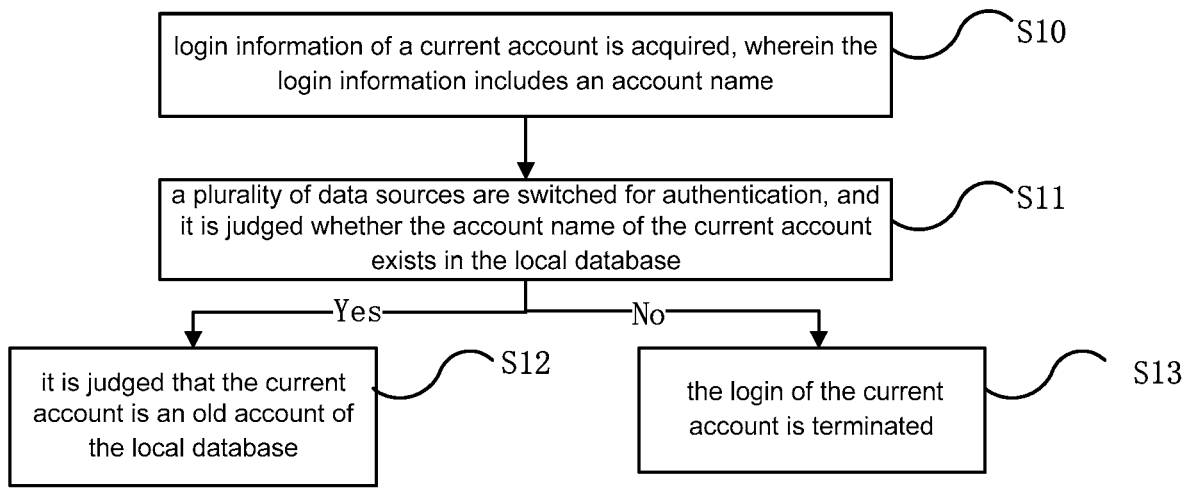
FIG. 3 is a schematic flowchart of judging an old account in one or more embodiments.

When the old account of the local database is logged in for the first time, it is necessary to recognize and determine that the current account is the old account of the local database, so that the identity authentication module can conveniently adjust a corresponding account management policy. As shown in FIG. 3, the before the step S1: the login information of the old account is acquired, so that the local database authenticates the login information of the old account, and the decrypted login information of the old account is acquired, the method further includes:

S10: login information of a current account is acquired, wherein the login information includes an account name;

S11: a plurality of data sources are switched for authentication, and it is judged whether the account name of the current account exists in the local database; and S12: in response to the account name of the current account existing in the local database, it is judged that the current account is an old account of the local database.

The method further includes S13: in response to the account name of the current account not existing in the local database, the login of the current account is terminated.

As shown in FIG. 3, in step S10, exemplarily, the login information of the current account may be acquired by means of a graphical user interface (Graphical User Interface, GUI), for example, the login information includes an account name, and as another example, the login information includes a password.

After the login information of the current account is acquired, in order to avoid the situation that the identity authentication module cannot recognize the type of the current account, for example, the type of the current account includes one of the following: first-time login of the old account of the local database, a new account, and an original account in the identity authentication module. As shown in FIG. 3, in step S11, exemplarily, the plurality of data sources may be switched for authentication, whether the account name of the current account exists may be retrieved or confirmed by means of the local database, which is used as a reference for judging whether the current account is the old account of the local database.

In response to the account name of the current account existing in the local database, it is judged that the current account is the old account of the local database, for example, account information in the local database is acquired, it is judged whether the field ext_resource_id is null (that is, it is judged whether the field ext_resource_id is a null value), if the field ext_resource_id is null, the step of associating the old account with the first account is continued, if the field ext_resource_id is not null, it indicates that the old account has been associated with the first account, and synchronization is completed, so that the old account can be forwarded to the identity authentication module for login verification; and if the current account is not the old account of the local database, the login of the current account is terminated, and the following information may also be pushed by means of the graphical user interface: the account or the password is wrong.

Figure 4:
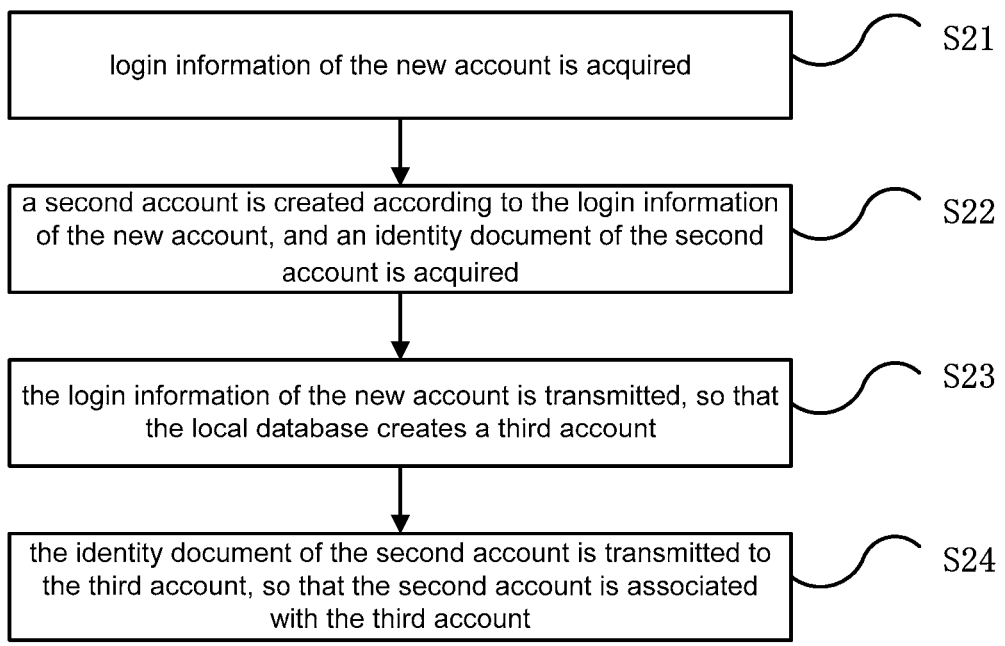
FIG. 4 is a schematic flowchart of managing a new account in one or more embodiments.

In order to adapt to the requirement of creating a new account of the cloud computing platform or the local database, and to enable the created new account to be associated with the cloud computing platform after version updating, as shown in FIG. 4, in some embodiments, the account management method further includes:

S21: login information of the new account is acquired;

S22: a second account is created according to the login information of the new account, and an identity document of the second account is acquired;

S23: the login information of the new account is transmitted, so that the local database creates a third account; and S24: the identity document of the second account is transmitted to the third account, so that the second account is associated with the third account. By means of acquiring the login information of the new account, synchronously creating the third account and the second account in the local database and the identity authentication module respectively, and associating the second account with the third account, the requirement of synchronizing the created new account in the local database and the cloud computing platform is met.

As shown in FIG. 4, in step S21, the login information of the new account may be acquired by means of the graphical user interface, wherein the login information at least includes one of the following: an account name, an account password, account information, and initiation of a creation requirement for the new account.

As shown in FIG. 4, in step S22, exemplarily, after the login information of the new account is acquired, the login of the identity authentication module may be realized by means of the administrator authority, the second account is created in the identity authentication module according to the login information of the new account, and the identity document of the second account is acquired, so that the security of account management is improved.

As shown in FIG. 4, in step S24, exemplarily, after the identity document of the second account is acquired, the third account is created in the local database, for example, the extended field ext_resource_id in an account table of the third account is used for recording the identity document of the corresponding second account in the identity authentication module, so as to ensure that the local database and the identity authentication module synchronously create the third account and the second account, wherein the third account is used for extending the account attributes, and the display efficiency of the graphical user interface may also be improved, the second account is used as a data source of account identity authentication, and the second account and the third account may also be associated by means of the ext_resource_id and the id attributes.

Figure 5:
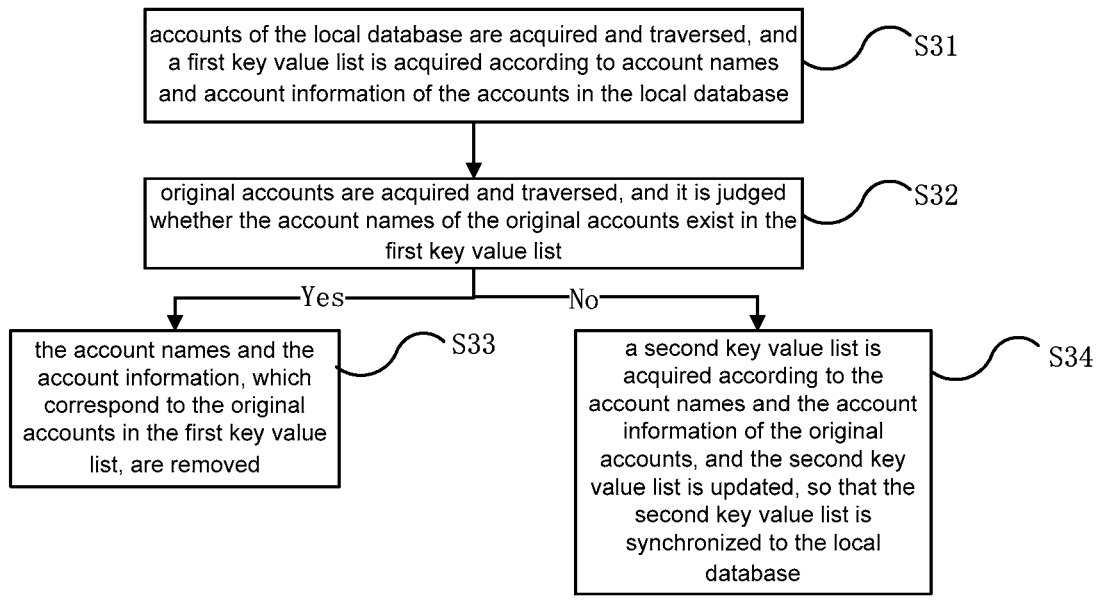
FIG. 5 is a schematic flowchart of updating an original account in one or more embodiments.

After the version of the cloud computing platform is updated, the old account and the new account in the local database, as well as original accounts in the identity authentication module are authenticated by means of the identity authentication module. However, after the version of the cloud computing platform is updated, the original accounts do not exist in the local database or other data sources, therefore it is necessary to perform data update or synchronization on the original accounts, so that the original accounts can normally log in and use the cloud computing platform. In order to improve the efficiency of updating or synchronizing the original accounts, different synchronization policies may be selected. As shown in FIG. 5, in some implementations, provided is a method for updating the original accounts:

S31: accounts of the local database are acquired and traversed, and a first key value list is acquired according to account names and account information of the accounts in the local database;

S32: original accounts are acquired and traversed, and it is judged whether the account names of the original accounts exist in the first key value list;

S33: in response to the account names of the original accounts existing in the first key value list, the account names and the account information, which correspond to the original accounts in the first key value list, are removed; and S34: in response to the account names of the original accounts not existing in the first key value list, a second key value list is acquired according to the account names and the account information of the original accounts, and the second key value list is updated, so that the second key value list is synchronized to the local database. The updating method may be automatically and synchronously set, for example, the updating method is set as a timing task, which is executed once at a fixed point every day, and the updating time and frequency may also be selected.

In step S31, exemplarily, accounts LocalUsers and an account list of the local database are acquired, the account list of the local database is traversed, the first key value list is formed by using the account name as a key and using the account information LocalUsers as a value, and the first key value list may also be stored in a Map (map database) data structure and is named as map1.

In step S32, exemplarily, the original accounts unifiedUsers and an account list of the identity authentication module are acquired, the account list of the original accounts in the identity authentication module is traversed, and it is judged whether the account name of each original account exists in the key list of the map1.

In step S33, exemplarily, in response to the account names of the original accounts being in the map1, key values corresponding to the original accounts are removed.

In step S34, exemplarily, in response to the account names of the original accounts being not in the map1, the account names and the account information of the original accounts are stored in the second key value list map2 as key values, and after the original accounts are traversed, the account information that needs to be synchronized to the local database is stored in the second key value list map2. As another example, the second key value list map2 is traversed, a corresponding account is created in the local database, the identity document id of the original account unifiedUser stored in the second key value list map2 is recorded in the field ext_resource_id, the associated account is enabled, then the accounts in the first key value list map1 are traversed, it is judged whether the ext_resource_id of the account in the local database is null (that is, it is judged whether the field ext_resource_id is a null value), if the ext_resource_id is not null, it indicates that the account is not an old account, and then the account is deleted from the local database; and if the ext_resource_id is null, it indicates that the account is an old account, and then the account is reserved for subsequent account association.

In some embodiments, the opportunity of updating or synchronizing the original accounts may also be autonomously selected, and a synchronization progress may also be displayed, for example, after the second key value list is updated, so that the second key value list is synchronized to local database, the method further includes:

a synchronization progress of synchronizing the second key value list to the local database is displayed, and when the number of the original accounts is greater than or equal to m, specifically, in response to the number of the original accounts being greater than or equal to m, the mathematical expression of the synchronization progress is:

$$stepPercent=(100-x-y)/(n/m)$$

wherein, stepPercent represents the synchronization progress, x represents a basic progress, y represents the progress of removing the account names and the account information, which correspond to the original accounts in the first key value list, x and y are constants, n represents the number of the original accounts, and m represents the number of accounts which are synchronized at one time. Therefore, after the task is executed, the synchronization progress is displayed on the interface, the synchronization progress is updated to an integer of [0, 100], for example, the basic progress x may be set to be 20%, the progress y of removing the corresponding account names and the account information in the first key value list is set to be 10%, and then the synchronization progress of the original accounts in the second key value list map2 is 70%. Since the synchronization process of the original accounts of the second key value list map2 may be designed as task self-circulation, a certain number of accounts are synchronized once the task is circulated, and the synchronization progress is updated once. When the number n of the original accounts in the second key value list map2 is [0, m], once the synchronization task is executed, the synchronization progress is updated to 90%, and when n>m, for example, when n is [10,700], when the number of accounts which are synchronized at one time is m=10, stepPercent=70/(n/10). As another example, when n is greater than 700, stepPercent is set to be 1, the synchronization progress is updated once for every n/70 accounts, and a synchronization progress bar is increased by 1% every time. By means of the policy, the synchronization progress of the accounts can be updated in real time, such that the user experience is optimized.

Figure 6:
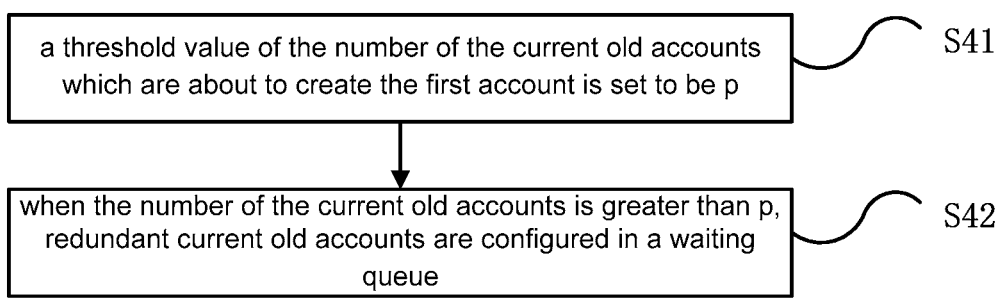
FIG. 6 is a schematic flowchart of creating a first account in one or more embodiments.

In order to solve the situation that the memory demand of the cloud computing platform overflows due to the concurrent login of the old accounts of the local database, as shown in FIG. 6, in some embodiments, the step of creating the first account according to the decrypted login information of the old account includes:

S41: a threshold value of the number of the current old accounts which are about to create the first account is set to be p, wherein p is a positive integer; and S42: when the number of the current old accounts is greater than p, redundant current old accounts are configured in a waiting queue. Specifically, in response to the number of the current old accounts being greater than p, the redundant current old accounts are configured in the waiting queue.

In step S41, the waiting queue of the current old accounts which are about to create the first account may employ a direct submission queue SynchronousQueue, and correspondingly, the number of core pools corePoolSize and the number of maximum pools maximumPoolSize are both set to be p, a CallerRunsPolicy rejection policy is used, for example, p may be set to be 1, for example, p may be set to be 2, and as another example, p may be set to be a positive integer greater than or equal to 3; and In step S42, when the number of the current old accounts which are about to create the first account reaches the upper limit p, the CallerRunsPolicy rejection policy configures, in the waiting queue, the current old accounts which are about to create the first account, for example, the current old accounts are placed in a caller thread for execution.

In some embodiments, the login information of the old account and the login information of the new account are acquired by means of the graphical user interface, for example, the corresponding login information is acquired by means of information input of a login interface, as another example, the corresponding login information may be acquired by means of an information transceiving page, and the current processing flow may be guided and prompted by means of the visual graphical user interface.

It should be understood that, although the steps in the flowcharts of FIGS. 2-6 are sequentially displayed according to the indication of the arrows, these steps are not necessarily executed sequentially in the order indicated by the arrows. Unless explicitly stated herein, the execution of these steps is not strictly limited in order, so that these steps may be executed in other orders. Moreover, at least some steps in FIGS. 2-6 may include a plurality of sub-steps or a plurality of stages, these sub-steps or stages are not necessarily executed at the same moment, but may be executed at different moments, and the execution sequence of these sub-steps or stages is also not necessarily executed in sequence, but may be executed in turn or alternately with other steps or at least some sub-steps or stages of the other steps.

Figure 7:
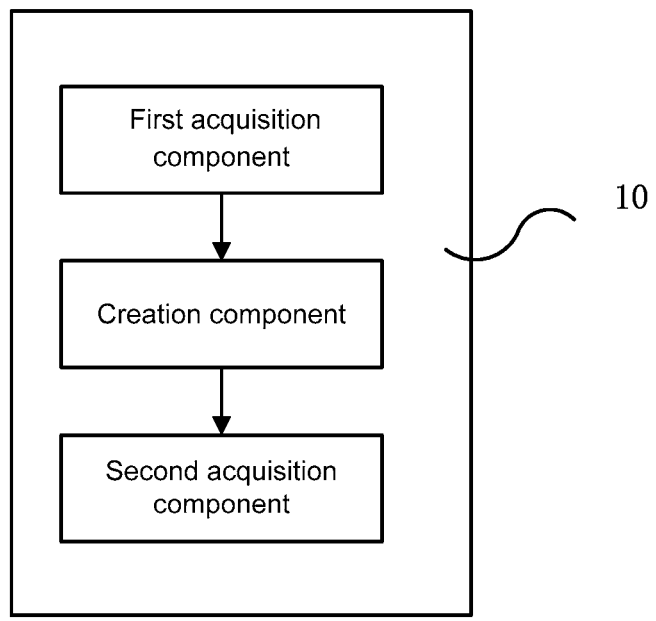
FIG. 7 is a structural block diagram of an identity authentication module in one or more embodiments.

In one or more embodiments, as shown in FIG. 7, provided is an account management apparatus. The account management apparatus includes an identity authentication module 10, wherein the identity authentication module 10 includes:

a first acquisition component, used for acquiring the login information of an old account, so that a local database authenticates the login information of the old account, and acquiring decrypted login information of the old account;

a creation component, used for creating a first account according to the decrypted login information of the old account; and a second acquisition component, used for acquiring an identity document of the first account, so that the identity document of the first account is transmitted to the old account corresponding to the local database, and associating the first account with the old account. In order to solve the problems of poor compatibility and low association degree of the accounts after software upgrading or version updating of the cloud computing platform, the identity authentication module may be provided for the identity authentication of the accounts. Before the software version of the cloud computing platform is updated, the old account of the local database is not associated with the identity authentication module, so that the first account may be created in the identity authentication module according to the decrypted login information of the old account, and the first account is associated with the old account. Therefore, the authentication and management of the accounts can be effectively realized after the version of the cloud computing platform is updated.

In one or more embodiments, the creation component is used for logging in the identity authentication module, and creating the first account in the identity authentication module according to the decrypted login information of the old account.

Figure 8:
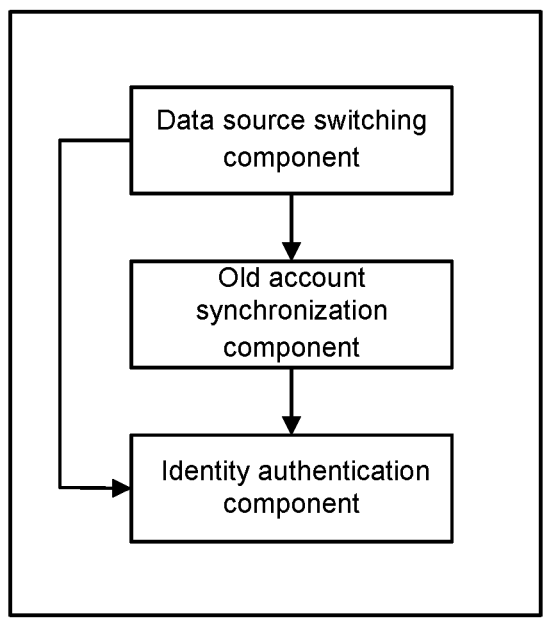
FIG. 8 is a structural block diagram of an account management apparatus in one or more embodiments.

As shown in FIG. 8, the account management apparatus further includes a data source switching module and an old account synchronization module. Exemplarily, after the login information of the current account is acquired, wherein the login information includes an account name, the data source switching module is used for switching a plurality of data sources for authentication; and the old account synchronization module is used for judging whether the account name of the current account exists in the local database, in response to the account name of the current account existing in the local database, judging that the current account is an old account of the local database, and in response to the account name of the current account not existing in the local database, terminating the login of the current account. When the old account of the local database is logged in for the first time, it is necessary to recognize and determine that the current account is the old account of the local database, so that the identity authentication module can conveniently adjust a corresponding account management policy. Therefore, the plurality of data sources are switched by the data source switching module for authentication, and it is judged by the old account synchronization module that whether the account name of the current account exists in the local database.

Figure 9:
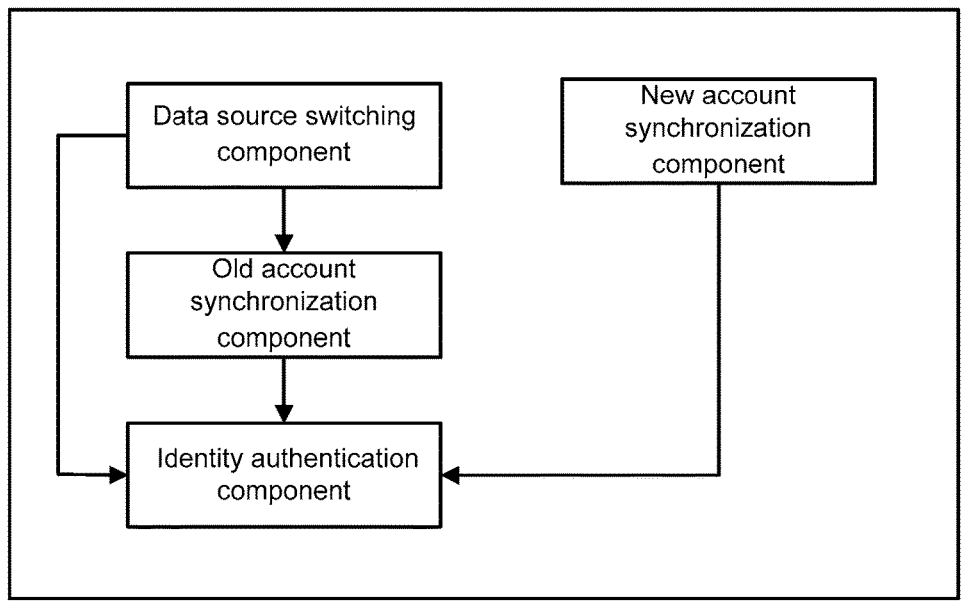
FIG. 9 is a structural block diagram of an account management apparatus in another one or more embodiments.

As shown in FIG. 9, the account management apparatus includes a data source switching module, an old account synchronization module, an identity authentication module and a new account synchronization module. After the login information of a new account is obtained, the new account synchronization module is used for logging in the identity authentication module, creating a second account according to the login information of the new account, acquiring the identity document of the second account, and transmitting the login information of the new account, so that the local database creates a third account, and transmitting the identity document of the second account to the third account, so that the second account is associated with the third account. The requirement of creating a new account of the cloud computing platform or the local database can be adapted, and the created new account can be associated with the cloud computing platform after version updating.

Figure 10:
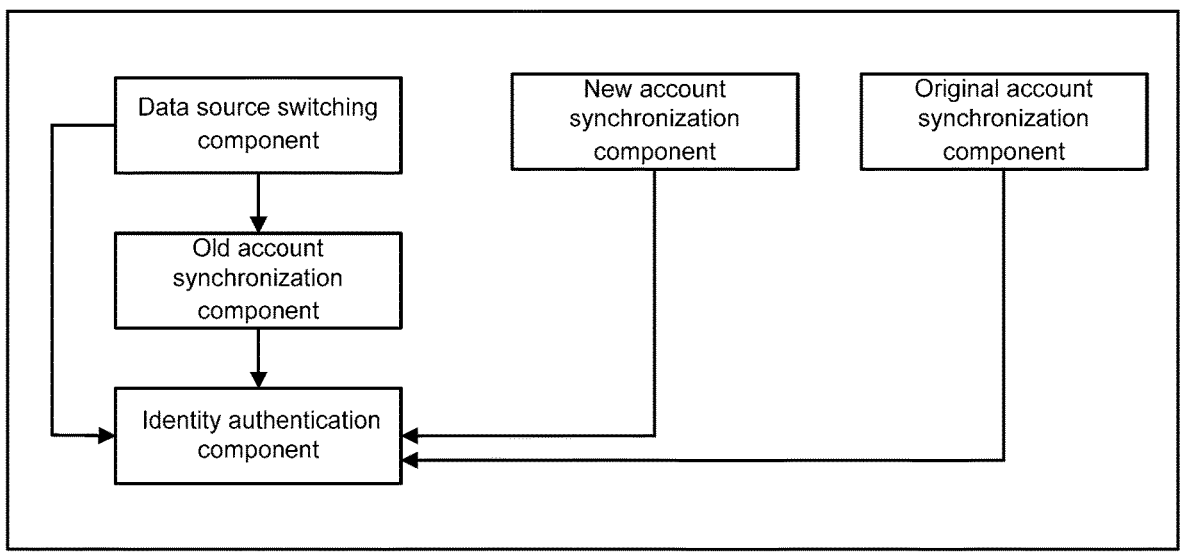
FIG. 10 is a structural block diagram of an account management apparatus in another one or more embodiments.

As shown in FIG. 10, the account management apparatus includes a data source switching module, an old account synchronization module, an identity authentication module, a new account synchronization module and an original account synchronization module, wherein the original account synchronization module is used for acquiring and traversing accounts of the local database; acquiring a first key value list according to account names and account information of the accounts in the local database; acquiring and traversing original accounts of the identity authentication module, and judging whether the account names of the original accounts exist in the first key value list; in response to the account names of the original accounts existing in the first key value list, removing the account names and the account information, which correspond to the original accounts in the first key value list; and in response to the account names of the original accounts not existing in the first key value list, acquiring a second key value list according to the account names and the account information of the original accounts, and updating the second key value list, so that the second key value list is synchronized to the local database.

In some embodiments, the original account synchronization module is further used for displaying a synchronization progress of synchronizing the second key value list to the local database, and when the number of the original accounts is greater than or equal to m, the mathematical expression of the synchronization progress is:

$$stepPercent=(100-x-y)/(n/m)$$

wherein, stepPercent represents the synchronization progress, x represents a basic progress, y represents the progress of removing the account names and the account information, which correspond to the original accounts in the first key value list, x and y are constants, n represents the number of the original accounts, and m represents the number of accounts which are synchronized at one time.

In some embodiments, the old account synchronization module is further used for setting, to be p, a threshold value of the number of the current old accounts which are about to create the first account, wherein p is a positive integer; and when the number of the current old accounts is greater than p, configuring redundant current old accounts in a waiting queue.

Figure 11:
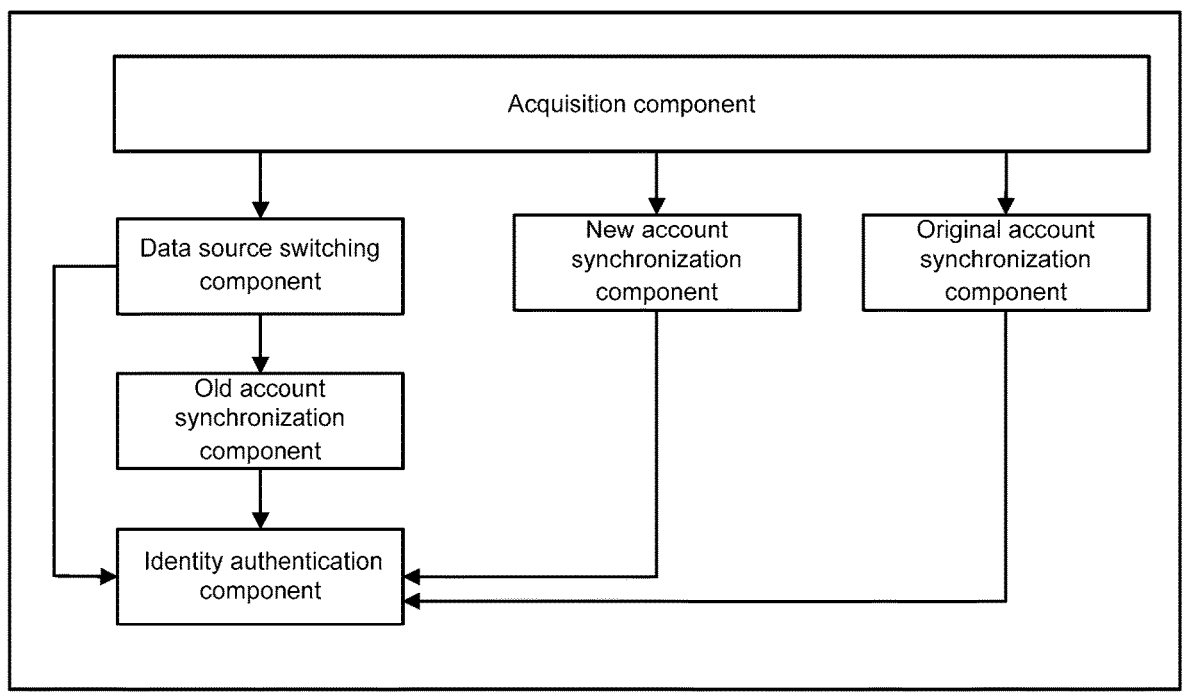
FIG. 11 is a structural block diagram of an account management apparatus in yet another one or more embodiments.

In some embodiments, as shown in FIG. 11, the account management apparatus further includes an acquisition module, wherein the acquisition module is used for acquiring the login information of the old account and the login information of the new account by means of a graphical user interface.

With regard to specific definitions of the account management apparatus, reference may be made to the definitions of the account management method in the above description, and thus details are not described herein again. All or some modules in the account management apparatus may be implemented by software, hardware, and a combination thereof. The above modules may be embedded into or independent of a processor in a computer device in the form of hardware, and may also be stored in a memory in the computer device in the form of software, so that the processor can conveniently invoke and execute operations corresponding to the above modules.

Figure 12:
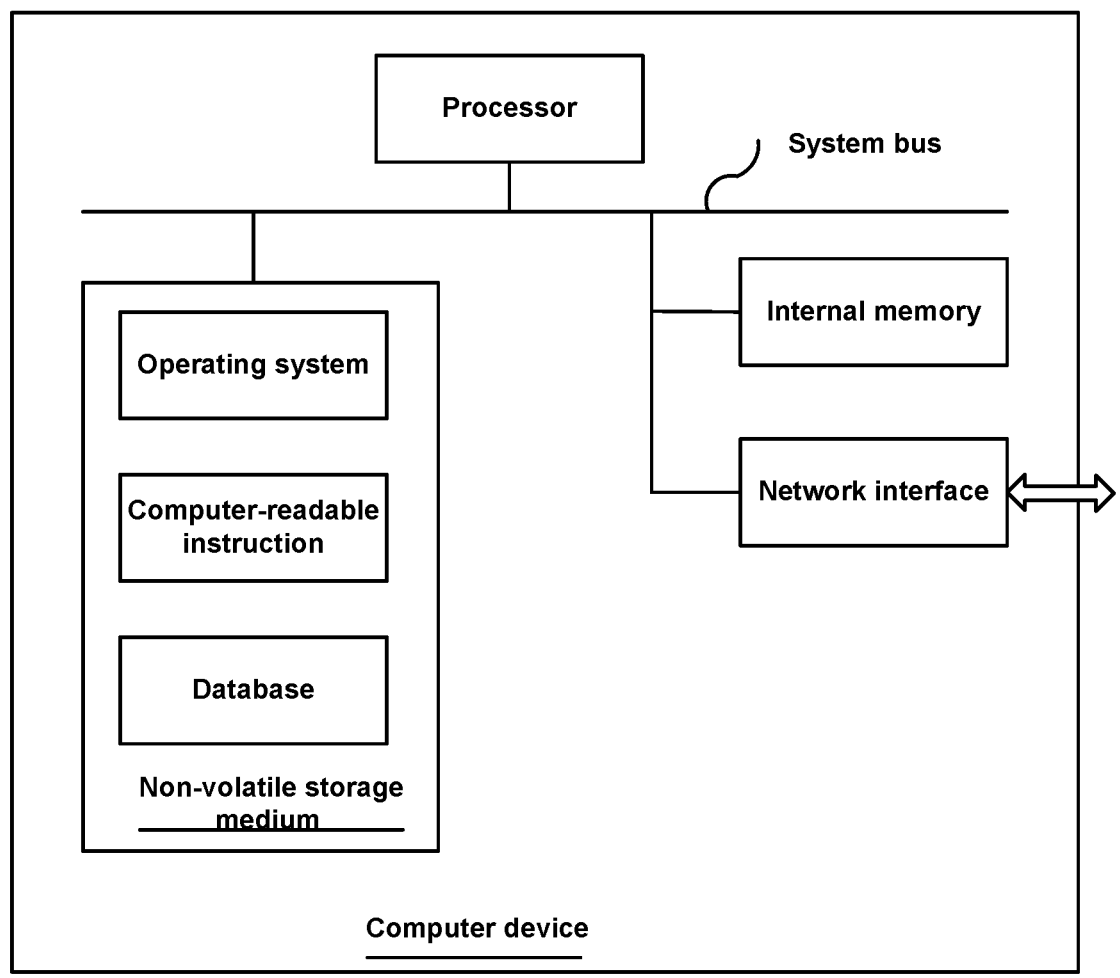
FIG. 12 is an internal structure diagram of a computer device in one or more embodiments.

In one or more embodiments, provided is a computer device, wherein the computer device may be a server, and an internal structure diagram thereof may be shown in FIG. 12. The computer device includes a processor, a memory, a network interface and a database, which are connected by a system bus. The processor of the computer device is used for providing computing and control capabilities. The memory of the computer device includes a non-transitory storage medium and an internal memory. The non-transitory storage medium stores an operating system, a computer-readable instruction and a database. The internal memory provides an environment for the operation of the operating system and the computer-readable instruction in the non-transitory storage medium. The database of the computer device is used for storing data of account management. The network interface of the computer device is used for communicating with an external terminal by means of a network connection. When executed by the processor, the computer-readable instruction implements an account management method.

Those skilled in the art can understand that, the structure shown in FIG. 12 is merely a block diagram of a partial structure related to the solutions of the present application, and does not constitute a limitation on the computer device to which the solutions of the present application are applied, and the specific computer device may include more or fewer components than those shown in the figure, or combine some components, or have different component arrangements.

In one or more embodiments, provided is a computer device, including a memory and one or more processors, wherein a computer-readable instruction is stored in the memory, and when the computer-readable instruction is executed by the processors, the one or more processors execute the steps of the account management method in any one of the foregoing embodiments.

In one or more embodiments, provided are one or more non-transitory storage media in which computer-readable instructions are stored, wherein when the computer-readable instructions are executed by one or more processors, the one or more processors execute the steps of the account management method in any one of the foregoing embodiments.

Those ordinary skilled in the art can understand that, all or some flows of the methods in the above embodiments may be implemented by a computer-readable instruction instructing related hardware, the computer-readable instruction may be stored in a non-transitory computer-readable storage medium, and when executed, the computer-readable instruction may include the flows of the embodiments of the above methods. Any reference to a memory, a storage, a database or other media used in various embodiments provided in the present application may include non-transitory and/or volatile memories. The non-transitory memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration and not limitation, the RAM may be available in various forms, such as a static RAM (SRAM), a dynamic RAM (DRAM), a synchronous DRAM (SDRAM), a dual-data-rate SDRAM (DDRSDRAM), an enhanced SDRAM (ESDRAM), a synchlink (Synchlink) DRAM (SLDRAM), a memory bus (Rambus) direct RAM (RDRAM), a direct memory bus dynamic RAM (DRDRAM), and a memory bus dynamic RAM (RDRAM), etc.

Various technical features of the above embodiments may be combined arbitrarily, for the conciseness of the description, not all possible combinations of the technical features in the above embodiments are described, however, as long as there is no contradiction in the combinations of these technical features, the combinations should be considered as the scope recorded in the present specification.

The above embodiments only express several implementations of the present application, and the description thereof is relatively specific and detailed, but cannot be understood as a limitation on the scope of the patent for invention. It should be noted that, for those ordinary skilled in the art, several variations and improvements may also be made without departing from the concept of the present application, and all these variations and improvements fall within the protection scope of the present application. Therefore, the protection scope of the present application should be subject to the appended claims.

The invention claimed is:

1. An account management method, comprising:
   acquiring login information of an old account, so that a local database authenticates the login information of the old account, and acquiring decrypted login information of the old account;
   creating a first account according to the decrypted login information of the old account; and
   acquiring an identity document of the first account, so that the identity document of the first account is transmitted to the old account corresponding to the local database, and associating the first account with the old account.

2. The account management method according to claim 1, wherein before the step: acquiring the login information of the old account, so that the local database authenticates the login information of the old account, and acquiring the decrypted login information of the old account, the method further comprises:
   acquiring login information of a current account, wherein the login information comprises an account name;
   switching a plurality of data sources for authentication, and judging whether the account name of the current account exists in the local database; and
   in response to the account name of the current account existing in the local database, judging that the current account is an old account of the local database.

3. The account management method according to claim 2, further comprising:
   in response to the account name of the current account not existing in the local database, terminating login of the current account.

4. The account management method according to claim 3, wherein further comprising:
   pushing the following information by means of a graphical user interface: the account or the password is wrong.

5. The account management method according to claim 2, wherein a type of the current account comprises one of the following: first-time login of the old account of the local database, a new account, and an original account in the identity authentication module.

6. The account management method according to claim 1, further comprising:
   acquiring login information of a new account;
   creating a second account according to the login information of the new account, and acquiring an identity document of the second account;
   transmitting the login information of the new account, so that the local database creates a third account; and
   transmitting the identity document of the second account to the third account, so that the second account is associated with the third account.

7. The account management method according to claim 6, wherein the login information of the old account and the login information of the new account are acquired by means of a graphical user interface.

8. The account management method according to claim 7, wherein the login information at least comprises one of the following: an account name, an account password, account information, and initiation of a creation requirement for the new account.

9. The account management method according to claim 6, wherein creating the second account according to the login information of the new account, and acquiring the identity document of the second account, comprises:
   after the login information of the new account is acquired, realizing the login of an identity authentication module by means of administrator authority, creating the second account in the identity authentication module according to the login information of the new account, and acquiring the identity document of the second account.

10. The account management method according to claim 6, wherein transmitting the identity document of the second account to the third account, so that the second account is associated with the third account, comprises:
using an extended field ext_resource_id in an account table of the third account for recording the identity document of a corresponding second account in an identity authentication module, so as to ensure that the local database and the identity authentication module synchronously create the third account and the second account, wherein the third account is used for extending account attributes, the second account is used as a data source of account identity authentication, and the second account and the third account is associated by means of the ext_resource_id and the account attributes.

11. The account management method according to claim 1, further comprising:
acquiring and traversing accounts of the local database, and acquiring a first key value list according to account names and account information of accounts in the local database;
acquiring and traversing original accounts, and judging whether the account names of the original accounts exist in the first key value list;
in response to the account names of the original accounts existing in the first key value list, removing the account names and the account information, which correspond to the original accounts in the first key value list; and
in response to the account names of the original accounts not existing in the first key value list, acquiring a second key value list according to the account names and the account information of the original accounts, and updating the second key value list, so that the second key value list is synchronized to the local database.

12. The account management method according to claim 11, wherein after the step: updating the second key value list, so that the second key value list is synchronized to the local database, the method further comprises:
displaying a synchronization progress of synchronizing the second key value list to the local database, wherein when the number of the original accounts is greater than or equal to m, a mathematical expression of the synchronization progress is:

stepPercent=(100−x−y)/(n/m)

wherein, stepPercent represents the synchronization progress, x represents a basic progress, y represents the progress of removing the account names and the account information, which correspond to the original accounts in the first key value list, x and y are constants, n represents the number of the original accounts, and m represents the number of accounts which are synchronized at one time.

13. The account management method according to claim 1, wherein the step of creating the first account according to the decrypted login information of the old account comprises:
setting, to be p, a threshold value of the number of the current old accounts which are about to create the first account, wherein p is a positive integer; and
when the number of the current old accounts is greater than p, configuring redundant current old accounts in a waiting queue.

14. The account management method according to claim 1, wherein the step of creating the first account according to the decrypted login information of the old account comprises:
logging in an identity authentication module, and creating the first account in the identity authentication module according to the decrypted login information of the old account.

15. The account management method according to claim 14, wherein logging in an identity authentication module comprises:
triggering the login permission of the identity authentication module by means of authenticating the login information of the old account for login.

16. The account management method according to claim 14, wherein acquiring an identity document of the first account, so that the identity document of the first account is transmitted to the old account corresponding to the local database, and associating the first account with the old account comprises:
acquiring the unique identity document id of the first account, storing the unique identity document id in a field ext_resource_id of the old account corresponding to the local database, so that the old account is associated with the first account, and the synchronization of the old account in the identity authentication module of the cloud computing platform is completed.

17. The account management method according to claim 16, wherein after acquiring the unique identity document id of the first account, storing the unique identity document id in a field ext_resource_id of the old account corresponding to the local database, the method further comprises:
acquiring account information in the local database, judging whether the field ext_resource_id is null;
if the field ext_resource_id is null, the step of associating the old account with the first account is continued.

18. The account management method according to claim 17, wherein the method further comprises:
if the field ext_resource_id is not null, it indicates that the old account has been associated with the first account, and synchronization is completed, so that forwarding the old account to the identity authentication module for login verification.

19. A computer device, comprising a memory and one or more processors, wherein a computer-readable instruction is stored in the memory, and when the computer-readable instruction is executed by the one or more processors, the one or more processors are enabled to:
acquire login information of an old account, so that a local database authenticates the login information of the old account, and acquire decrypted login information of the old account;
create a first account according to the decrypted login information of the old account; and
acquire an identity document of the first account, so that the identity document of the first account is transmitted to the old account corresponding to the local database, and associate the first account with the old account.

20. One or more non-transitory computer-readable storage media in which computer-readable instructions are stored, wherein when the computer-readable instructions are executed by one or more processors, the one or more processors are enabled to:

acquire login information of an old account, so that a local database authenticates the login information of the old account, and acquire decrypted login information of the old account;
create a first account according to the decrypted login information of the old account; and
acquire an identity document of the first account, so that the identity document of the first account is transmitted to the old account corresponding to the local database, and associate the first account with the old account.

* * * * *